United States Patent
Debate et al.

(10) Patent No.: US 9,354,849 B2
(45) Date of Patent: May 31, 2016

(54) MODIFICATION OF COMPILED APPLICATIONS AND APPLICATION MANAGEMENT USING RETRIEVABLE POLICIES

(71) Applicants: Jeremy Debate, Boston, MA (US); Aaron A. Alexander, Banning, CA (US); Ricardo Villamil, Somerville, MA (US); James P. Seibel, Jamaica Plain, MA (US)

(72) Inventors: Jeremy Debate, Boston, MA (US); Aaron A. Alexander, Banning, CA (US); Ricardo Villamil, Somerville, MA (US); James P. Seibel, Jamaica Plain, MA (US)

(73) Assignee: Apperian, Inc., Boston, MA (US)

( * ) Notice: Subject to any disclaimer, the term of this patent is extended or adjusted under 35 U.S.C. 154(b) by 0 days.

(21) Appl. No.: 14/208,068

(22) Filed: Mar. 13, 2014

(65) Prior Publication Data

US 2014/0282446 A1  Sep. 18, 2014

Related U.S. Application Data

(60) Provisional application No. 61/781,481, filed on Mar. 14, 2013.

(51) Int. Cl.
   *G06F 9/44* (2006.01)
   *G06F 9/45* (2006.01)
   *G06F 9/445* (2006.01)
   *G06F 21/54* (2013.01)

(52) U.S. Cl.
   CPC .............. *G06F 8/41* (2013.01); *G06F 9/44521* (2013.01); *G06F 21/54* (2013.01)

(58) Field of Classification Search
   None
   See application file for complete search history.

(56) References Cited

U.S. PATENT DOCUMENTS

| | | | |
|---|---|---|---|
| 6,216,175 B1 * | 4/2001 | Sliger | G06F 8/68 341/106 |
| 6,260,190 B1 * | 7/2001 | Ju | 717/156 |
| 6,915,510 B1 * | 7/2005 | Tock et al. | 717/165 |
| 6,948,164 B2 | 9/2005 | Tinker | |
| 7,725,890 B2 * | 5/2010 | Kawaura | G03G 15/5075 717/168 |
| 7,765,579 B2 * | 7/2010 | Wallace | 726/1 |
| 7,779,394 B2 * | 8/2010 | Homing et al. | 717/136 |
| 8,887,141 B2 * | 11/2014 | Day et al. | 717/148 |
| 2002/0073398 A1 * | 6/2002 | Tinker | 717/110 |

(Continued)

OTHER PUBLICATIONS

International Search Report PCT/US2014/25397.

*Primary Examiner* — Insun Kang
(74) *Attorney, Agent, or Firm* — Chapin IP Law, LLC

(57) ABSTRACT

A multi-component control technique includes a first component and a second component. The first component is supplemental code or evaluation engine as specified by a modification to a set of received originally compiled executable code. The modification to the original executable code ensures that, upon execution, the supplemental code (such as an evaluation engine) as specified by the modification is executed upon initial instantiation or use of the application. The second component is a retrievable and executable policy such as a set of rules fetched and used by the supplemental code to control the functionality supported by the originally compiled executable code of the corresponding application. An application administrator can produce the retrievable policy to control functionality of the originally compiled executable code.

19 Claims, 11 Drawing Sheets

(56) References Cited

U.S. PATENT DOCUMENTS

| | | | |
|---|---|---|---|
| 2002/0087956 A1* | 7/2002 | Darlet | G06F 9/44521 717/159 |
| 2004/0015927 A1* | 1/2004 | Haber | G06F 8/443 717/155 |
| 2004/0237067 A1* | 11/2004 | Sun et al. | 717/110 |
| 2006/0161768 A1* | 7/2006 | Baissus et al. | 713/152 |
| 2007/0074169 A1* | 3/2007 | Chess | G06F 21/54 717/126 |
| 2009/0089766 A1* | 4/2009 | Day et al. | 717/148 |
| 2009/0119653 A1 | 5/2009 | Kettley et al. | |
| 2009/0328067 A1* | 12/2009 | Srinivasan | G06F 8/30 719/316 |
| 2010/0037100 A1* | 2/2010 | Lopian | 714/35 |
| 2010/0287541 A1* | 11/2010 | Saunders et al. | 717/139 |
| 2010/0333079 A1* | 12/2010 | Sverdlov et al. | 717/168 |
| 2011/0066999 A1 | 3/2011 | Rabinovich et al. | |
| 2012/0023487 A1* | 1/2012 | Letca | G06F 11/3466 717/130 |
| 2012/0036554 A1 | 2/2012 | Golan et al. | |
| 2012/0124559 A1* | 5/2012 | Kondur | 717/125 |
| 2013/0276056 A1* | 10/2013 | Epstein | G06F 21/604 726/1 |
| 2013/0283245 A1* | 10/2013 | Black et al. | 717/130 |
| 2014/0013316 A1* | 1/2014 | Kemmler et al. | 717/170 |
| 2014/0059525 A1* | 2/2014 | Jawa | G06F 21/53 717/162 |
| 2014/0181801 A1* | 6/2014 | Voronkov et al. | 717/177 |

* cited by examiner

MAP
INFORMATION
460-1

(FOR APPLICATION 150-1)

| USER IDENTIFIER | POLICY |
|---|---|
| JOHN SMITH | 250-1 |
| DAVID JOHNSTON | 250-2 |
| PAULA KERRY | 250-3 |
| ... | ... |
| ENGINEER GROUP (WESTOVER) | 250-J |
| ... | ... |

FIG. 4

MODIFICATION OF COMPILED APPLICATIONS AND APPLICATION MANAGEMENT USING RETRIEVABLE POLICIES

RELATED APPLICATION

This application is related to and claims the benefit of earlier filed U.S. Provisional Patent Application Ser. No. 61/781,481 entitled "MODIFICATION OF COMPILED APPLICATIONS AND APPLICATION MANAGEMENT USING RETRIEVABLE POLICIES," (Attorney Docket No. APP12-08p), filed on Mar. 14, 2013, the entire teachings of which are incorporated herein by this reference.

BACKGROUND

There currently exist many different types of computer applications to perform any number of different functions. For example, e-mail applications enable respective users to send and retrieve e-mails; browser applications enable respective users to access the Internet and perform research; navigation applications enable users to view their current location on a map and navigate an unknown location; and so on.

Employers are beginning to realize that use of certain applications enable their respective employees to be more productive on the job. Hence, in certain instances, employers actually make a repository of one or more installable applications available to their employees to perform useful functions. Typically, via a browser, the employees are able to view the available applications in the repository and, if desired, install the applications on their respective computer device.

In many instances, an organization and/or corresponding application administrator that makes the one or more applications available for use by different employees has no control over use of the applications after downloading and installation. For example, an application administrator can receive a compiled and linked set of executable code (e.g., an executable program) from a software vendor. The administrator stores a copy of the executable code on a server accessible by the employees in an organization. As mentioned above, employees then access the server to download and install the available one or more applications onto their respective computer devices.

BRIEF DESCRIPTION

The distribution of executable code by an application administrator in an organization as discussed above can suffer from deficiencies. For example, the application administrator of an organization may desire to control use of certain applications installed on respective employees' computer devices. In certain instances, use of an application by an employee may be inappropriate at certain time.

One way to provide the administrator control over use of a specific application is to modify the corresponding source code of the application to include control capability. The modified source code can be recompiled and provided to the application administrator of the company. Via the control capability coded in the original source code, the administrator may be able to control employee use of functionality supported by the vendor-generated application.

Custom modification to source code to provide corresponding custom control to an administrator would be costly, especially if the software owner does not foresee the need to provide such control for multiple end users.

Embodiments herein include a novel manner of distributing and controlling use of one or more software applications.

More specifically, in accordance with one non-limiting example embodiment, a processing resource receives a compiled application of original executable computer code. The originally compiled executable code can be low-level machine executable code produced by a software vendor. The processing resource modifies the compiled application of low-level machine code to execute supplemental computer code (such as a set of executable instructions, machine code, CPU instructions, etc.) with respect to the original compiled executable code upon instantiation. Instantiation can include execution of the modified compiled application on a respective host computer device on which the modified executable application is installed.

In one embodiment, the supplemental computer code as specified by a modification to originally compiled executable code is coded to fetch and execute a policy of rules to control usage of functionality supported by the originally compiled executable code.

Subsequent to being modified, a suitable resource then provides access to the modified compiled application for installation on one or more host computers. As discussed herein, an application administrator of an organization such as a corporation can generate the policy and control use of the functionality supported by the originally compiled executable code. The policy can be dynamic and change over time as desired by the application administrator (i.e., entity that controls use of one or more applications in an organization).

More specifically, by way of a non-limiting example, an application administrator can produce the policy to include a set of rules. In addition to fetching the policy, the supplemental code such as an evaluation engine can be coded to receive and/or retrieve data (e.g., status information, facts, etc.) to execute the set of rules. In one embodiment, the supplemental code on a host computer retrieves a policy, executes a set of one or more rules in the policy view of received/retrieved data, and controls usage of the functionality supported by the original executable computer code via the policy.

In one embodiment, subsequent to installation of the modified compiled application, a respective user can initiate use of the installed application including the modification. For example, a host computer device can receive a request to execute the modified compiled application installed on a respective host computer device. As previously mentioned, the installed application can include the originally compiled executable code as well as a modification. The modification can include the supplemental code or indicate a location from which to retrieve the supplemental code.

In response to the request to execute the modified compiled application, the host computer executes the supplemental computer code as specified by the modification. In one embodiment, without the modification, the originally compiled executable code would not include or execute the supplemental code.

As specified by the executed supplemental computer code, the host computer device initiates retrieval of a policy from a remote resource. In one embodiment, as previously discussed, the supplemental code executes the retrieved policy to generate control decisions with respect to functions supported by the originally compiled code.

Modification of an originally compiled application enables a level of control not afforded by conventional techniques. For example, an application administrator in an organization can initiate modification of originally compiled code to execute supplemental code such as an evaluation engine (e.g., supplemental code not originally included in the compiled application). Via generation of a dynamic policy of rules by the application administrator, the organization can further control use of the installed application. More specifically, the evaluation engine instantiated by the application can be configured to retrieve and execute the policy, which is potentially customized to a specific user of the host computer device, to control which functions can be executed by the specific user and/or host computer device.

Thus, embodiments herein include a two-component control system. The first component is the supplemental code or evaluation engine as specified by the modification to the originally compiled executable code. As mentioned, in one embodiment, the modification to the original executable code ensures that, upon execution, supplemental code is executed upon initial instantiation of the application. The second component is the retrievable and executable policy that controls the functionality of the corresponding application. As mentioned, the application administrator can customize the policy to be used by the respective modified compiled application on a per user basis. That is, a policy generated for a first person can enable different functionality in the modified compiled application than functionality enabled by a second person.

As mentioned, the custom policy can include a set of rules executable by the supplemental code. As mentioned, an application administrator can produce the retrievable policy to control functionality of the originally compiled executable code. In this manner, via the two-component system, an application administrator of an organization can control use of specific applications installed on, for example, each of multiple organization members' computer devices.

These and other embodiments are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any suitable computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or microcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, one particular embodiment of the present disclosure is directed to a method and computer program product that includes a computer readable hardware storage medium having instructions stored thereon. In one embodiment, the instructions, when executed by a processor (i.e., one or more processor devices) of a respective computer device, cause the processor to: receive a compiled application of original executable computer code; modify the compiled application to execute supplemental computer code with respect to the original executable code upon instantiation, the supplemental code coded to fetch and execute a policy to control usage of functionality supported by the original executable computer code; and providing access to the modified compiled application for installation on at least one host computer.

Another particular embodiment of the present disclosure is also directed to a method and computer program product that includes a computer readable hardware storage medium having instructions stored thereon. In one embodiment, the instructions, when executed by a processor (i.e., one or more processor devices) of a respective computer device, cause the processor to: receive a request to execute an application installed on a host computer device, the application including originally compiled executable code and a modification to a portion of the originally compiled code; in response to the request, and as specified by the modification, execute supplemental computer code as specified by the modification; and initiate retrieval of a policy as specified by the executed supplemental computer code, the executed supplemental code controlling usage of functions supported by the originally compiled code.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the systems, methods, apparatus, instructions on computer readable storage media, etc., as discussed herein can be embodied strictly as a software program, as a hybrid of software and hardware, or as hardware alone such as within a processor, or within an operating system or a within a software application.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For an additional summary, details and/or possible perspectives (permutations) of the invention(s), and additional points of novelty, the reader is directed to the Detailed Description section and corresponding figures of the present disclosure as further discussed below.

BRIEF DESCRIPTION OF THE DRAWINGS

FIG. 4 is an example diagram illustrating mapping information to retrieve and distribute an appropriate policy according to embodiments herein.

Figure 1:
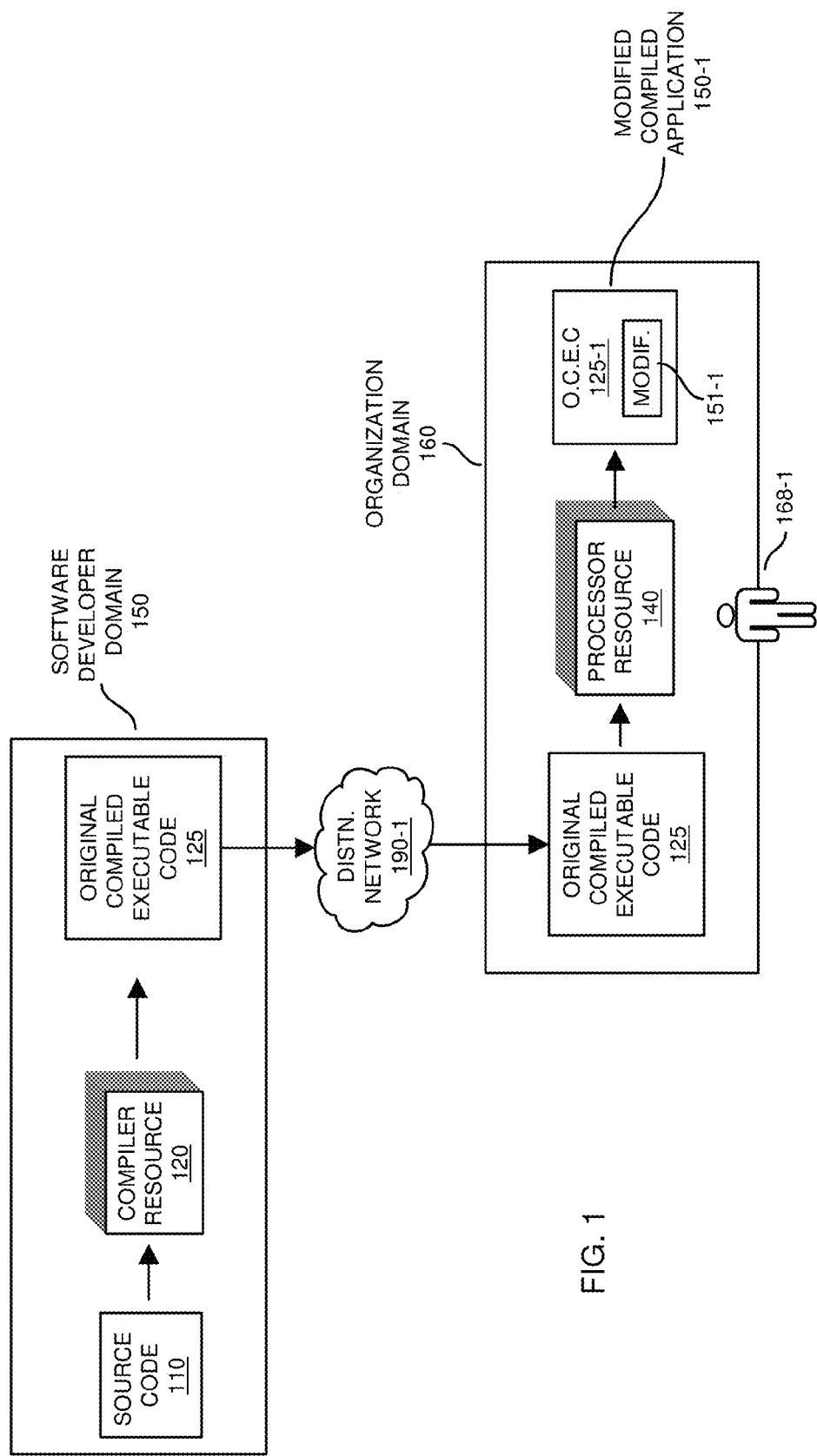
FIG. 1 is an example diagram illustrating distribution of originally compiled executable code to a remote location that modifies the originally compiled executable code according to embodiments herein.

The foregoing and other objects, features, and advantages of embodiments herein will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

By way of a non-limiting example, one embodiment herein includes a multi-component control system. The control system includes a first component and a second component. The first component is supplemental code or evaluation engine as specified by a modification to a set of received originally compiled executable code. The modification to the original executable code ensures that, upon execution, the supplemental code (such as an evaluation engine) as specified by the modification is executed upon initial instantiation or use of the application. The second component is a retrievable and executable policy such as a set of rules fetched and used by the supplemental code to control the functionality supported by the originally compiled executable code of the corresponding application. An application administrator can produce the retrievable policy to control functionality of the originally compiled executable code.

More specifically, FIG. 1 is an example diagram illustrating distribution of originally compiled executable code to a remote location that modifies the originally compiled executable code according to embodiments herein.

One or more software developers in software developer domain 150 produce source code 110. As is known, the source code 110 can include any collection of computer instructions (e.g., text-based, human readable instructions, data, etc.) to perform respective one or more functions on a computer.

By way of a non-limiting example, human software developers produce the source code 110 using high-level, text-based instructions according to one or more respective computer languages such as C, C++, Visual Basic, etc. The source code 110 may include comments indicating functionality performed by different parts of the source code.

Source code 110 can support any suitable type of functionality executable on a respective computer device.

The software vendor or entity that develops source code 110 typically has a desire to prevent unauthorized parties access to source code 110 to prevent copying and/or other fraudulent use of source code 110.

Via compiler resource 120, the software vendor compiles the source code 110 into originally compiled executable code 125. By way of a non-limiting example, the originally compiled executable code 125 can be low-level machine code understood and executable by a respective host computer. That is, the originally compiled executable code 125 can be installed on a respective host computer device to perform different functions as coded by respective source code 110.

Thus, in general, the originally compiled executable code 125 is a conversion of the source code 110 into low-level machine code or so-called binary.

Embodiments herein include receiving and modifying a compiled application of original executable computer code 125.

More specifically, as shown, a software vendor can make the originally compiled executable code 125 available to one or more respective customers.

By way of a non-limiting example, the software vendor can distribute the originally compiled executable code 125 to one or more customers in any suitable manner. For example, in one embodiment, an application administrator 168-1 in organization domain 160 (such as a business entity including one or more members, employees, etc.) can retrieve and/or receive originally compiled executable code 125 from the software vendor over network 190-1 such as the Internet.

Other suitable methods include physical delivery of the originally compiled executable code 125 on non-volatile memory, optical disk, etc., from the software vendor to the application administrator 168-1.

In one embodiment, the application administrator 168-1 or other suitable resource initiates modification of the originally compiled executable code 125 prior to distribution to respective organization members. As an example, via processing resource 140 (e.g., a modifier application), the application administrator 168-1 produces modified compiled application 150-1 (such as low-level, computer machine executable code) based on originally compiled executable code 125.

The modified compiled application 150-1 can include originally compiled executable code 125-1. Originally compiled executable code 125-1 represents all or a portion of the originally compiled executable code 125 provided by the software vendor. Notably, the modified compiled application 150-1 includes modification 151-1 with respect to originally compiled executable code 125.

In one non-limiting example embodiment, the modification 151-1 to originally compiled executable code 125 causes execution of supplemental computer code with respect to the original executable code 125-1 upon subsequent instantiation (i.e., execution) of the modified compiled application 150-1. The supplemental code can be low-level computer machine-readable code including one or more computer instructions not originally included in or not originally intended to be executed by the originally compiled executable code 125. Thus, inclusion of the modification 151-1 alters performance of the originally compiled executable code 125.

In accordance with further embodiments, the processing resource 140 can be configured to modify the originally compiled executable code 125 in a number of different ways to produce modified compiled application 150-1.

For example, the processing resource 140 can be configured to modify a header in the originally compiled executable code 125. In such an instance, the modified header (such as modification 151-1) indicates to load the supplemental code upon execution of the modified compiled application 150-1 on a respective host computer on which the modified compiled application is subsequently installed and executed.

In accordance with another embodiment, the processing resource 140 can be configured to retrieve the supplemental computer code and add, insert, inject, substitute, etc., the supplemental computer code (e.g., a library link, machine code, etc.) into the original executable computer code 125 to produce the modified compiled application 150-1. Some modifications of originally compiled executable code 125 may be needed to insert the originally compiled executable code 125.

In accordance with yet further embodiments, the supplemental code as specified by the modification 151-1 need not be included in the modified compiled application 150-1. Instead, the modification 151-1 can specify a respective location from which to retrieve the supplemental code.

Note that the application administrator 168-1 in organization domain 160 can receive any number of different applications from multiple software vendors. In a similar manner as discussed above, the application administrator 168-1 can modify originally compiled executable code received for each of multiple different types of software applications that are eventually made available for use by one or more members in the organization.

As discussed below in more detail, the supplemental code as specified by the modification 151-1 can be coded to fetch and execute and/or evaluate a corresponding policy of one or more rules in view of one or more so-called facts (e.g., data such as status information, settings, etc.).

By way of a non-limiting example, the policy and/or rules can include executable code, instructions, etc. In such an instance, the supplemental code such as an evaluator function) executes the instructions in the retrieved policy.

In accordance with further embodiments, the supplemental code, when executed upon instantiation of the modified compiled application 150-1, evaluates the one or more rules in the policy in view of settings of corresponding status information and/or other data pertaining to the one or more rules. As further described herein, each rule can specify one or more different types of data that are to be used to evaluate the respective rule. In accordance with the retrieved policy, rules, and/or facts (such as data used by the rules to make decisions), the supplemental code controls usage of functionality coded in the original executable computer code 125.

Figure 2:
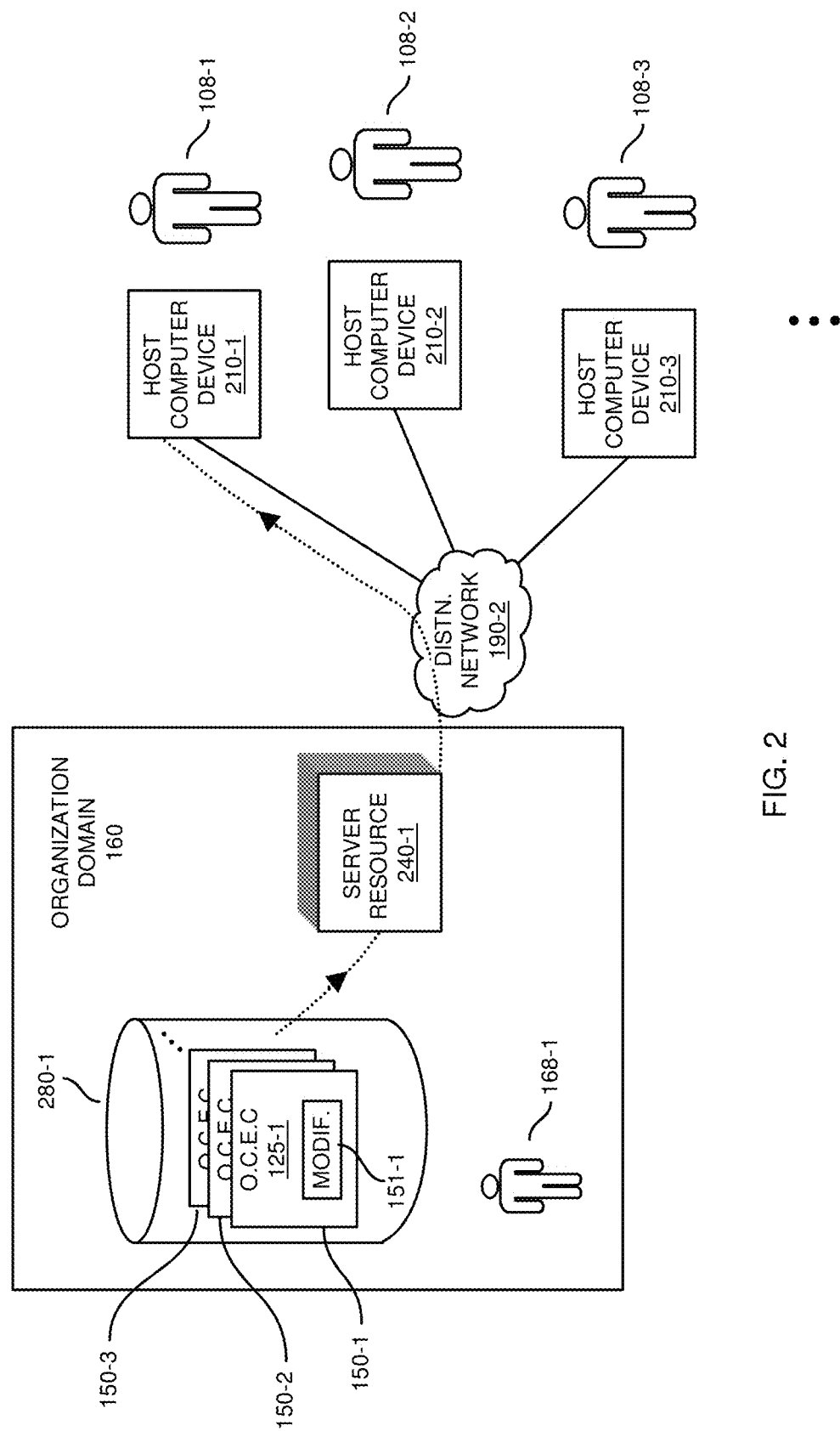
FIG. 2 is an example diagram illustrating distribution of a modified compiled application including originally compiled executable code and a corresponding modification according to embodiments herein.

FIG. 2 is an example diagram illustrating distribution of one or more modified compiled applications according to embodiments herein.

As shown, the application administrator 168-1 initiates storage of one or more modified compiled applications 150 (e.g., modified compiled application 150-1, modified compiled application 150-2, etc.) in repository 280-1. Each of the modified compiled applications 150 can support different functions. For example, modified compiled application 150-1 may support e-mail management; modified compiled application 150-2 may support web browsing capability; modified compiled application 150-3 may be a word processor application; and so on.

As previously discussed, the application administrator 168-1 can make the one or more modified compiled applications 150 stored in repository 280-1 available to one or more persons such as user 108-1, user 108-2, user 108-3, etc.

The application administrator 168-1 can control distribution of the modified compiled applications 150. For example, a first group of one or more users in the organization may be authorized to retrieve and install modified compiled application 150-1 on their respective host computer device; a second group of one or more users may be authorized to retrieve and install modified compiled application 150-2 on their device; and so on.

In one embodiment, users 108 can view a listing of available applications via access to a web page sponsored by the organization. By way of a non-limiting example, the users 108 can be members (such as employees) of an organization having access to the respective modified compiled applications 150. The users 108 access the web page to download and install one or more respective modified compiled applications 150 (for which they are authorized access) onto their respective host computer devices 210.

In one non-limiting example embodiment, the application administrator 168-1 makes the modified compiled applications 150 available to users so that they are able to more effectively perform their jobs.

Assume, in this example, that the user 108-1 communicates over network 190-2 such as the Internet and retrieves and installs the modified compiled application 150-1 onto host computer device 210-1.

Figure 3:
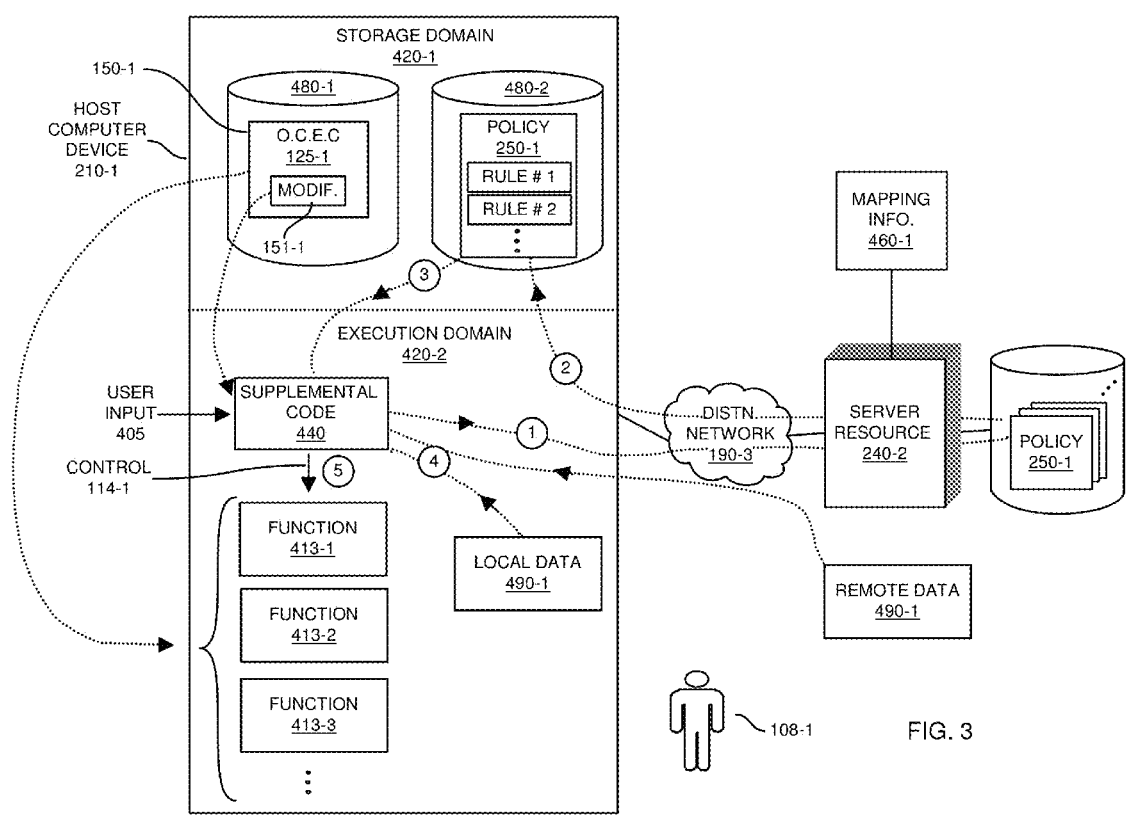
FIG. 3 is an example diagram illustrating execution of a modified compiled application according to embodiments herein.

FIG. 3 is an example diagram illustrating use of the modified compiled application according to embodiments herein.

As previously discussed, the user 108-1 initiates installation of modified compiled application 150-1 on their respective host computer device 210-1. The host computer device 210-1 stores the modified compiled application 150-1 in repository 480-1 of storage domain 420-1.

Subsequent to installation of respective modified compiled application 150-1 on host computer device 210-1, assume that the host computer device 210-1 receives user input 405 including a request to execute the modified compiled application 150-1. Recall that modified compiled application 150-1 is stored in repository 480-1 in storage domain 410-1 of the host computer device 210-1. Also, as previously discussed, the modified compiled application 150-1 includes all or a portion of the originally compiled executable code 125 produced by the software vendor from the respective source code 110.

In response to receiving the request to execute the modified compiled application 150-1, one or more processor devices in execution domain 420-2 of host computer device 210-1 instantiates and/or executes supplemental code 440 as specified by the modification 151-1.

Also, in response to receiving the request, in accordance with the supplemental code, the one or more processor devices in execution domain 420-2 can be configured to control instantiation of one or more functions 413 (e.g., function 413-1, function 413-2, function 413-3, etc.) associated with originally compiled executable code 125-1. In general, the functions 413 enable execution of the different operations supported by originally compiled executable code 125-1.

As previously discussed, note again that the supplemental code 440 as specified by the modification 151-1 can be retrieved from the modified compiled application 150-1 or retrieved from a remote resource as specified by the modification 151-1.

Accordingly, execution of the supplemental code 440 can first require retrieval of the supplemental code 440 from a resource as specified by modification 151-1 and loading of the supplemental code 440 for execution on the host computer device 210-1.

In one embodiment, upon execution, the supplemental code 440 initiates retrieval of a policy as specified by the executed supplemental computer code 440 in order to make control decisions with respect to usage of functions 413 (e.g., function 413-1, function 413-2, function 413-3, etc.) supported by the originally compiled code 125-1. As previously discussed, the policy retrieved by the supplemental code 440 can be customized for the particular user 108-1 operating the host computer device 210-1.

Assuming that this is a first instance of executing modified compiled application 150-1 on host computer device 210-1, the supplemental code 440 checks storage domain 420-1 for a respective policy to execute. In response to detecting that a policy is not stored in cache (because no policy has been retrieved yet), the supplemental code 440 initiates retrieval of a respective policy over network 190-3. In one non-limiting example embodiment, if a connection is not available to retrieve the policy, the supplemental code 440 can use a default policy until network access enables retrieval of the customized policy for the user 108-1.

Retrieval of the appropriate policy can include first obtaining one or more types of information such as an identifier of the user 108-1, identifier of the host computer device 210-1, version number of the modified compiled application 150-1 making the request for the policy, version number of the supplemental code 440 making the request for the policy, etc. This information can be locally or remotely available with respect to the host computer device 210-1.

The supplemental code 440 can specify the information needed to send to server resource 240-2 to retrieve a respective policy. Alternatively, the supplemental code 440 can be configured to communicate with the server resource 240-2 or other suitable resource to inquire as to what information is needed from the host computer device 210-1 to retrieve the appropriate policy for executing modified compiled application 150-1.

Subsequent to collection of appropriate information (e.g., user identifier information, computer identifier information, etc.) as specified by instructions in the supplemental code 440 and/or notification of needed information as specified by server resource 240-2 (or other suitable resource), the supplemental code 440 in host computer device 210-1 forwards the appropriate information over network 190-3 to server resource 240-2.

In response to receiving the request for retrieval of a corresponding policy from supplemental code 440, the server resource 240-2 utilizes mapping information 460-1 (as shown in FIG. 4) to determine the appropriate policy to forward to host computer device 210-1.

As previously discussed, each of multiple users can be assigned a different policy created by a respective application administrator 168-1. Thus, for a given modified compiled application such as 150-1, the application administrator 168-1 can produce a different policy for each of multiple different end users and/or groups of users. Each policy can enable the corresponding user to perform different functionality as specified by the application administrator 168-1.

In one non-limiting example embodiment, the mapping information 460-1 specifies the appropriate policy to be distributed to the different users for a given application.

In this example embodiment, assume that the server resource 240-2 receives information indicating that the user 108-1 associated with host computer device 210-1 is John Smith in the organization and that the modified compiled application for which a policy is requested is modified compiled application 150-1. In such an instance, the server resource 240-2 utilizes the map information 460-1 to identify that policy 250-1 is the appropriate policy to transmit over network 190-3 to the host computer device 210-1.

Via any suitable network communication protocol, the host computer device 210-1 receives the policy 250-1. The host computer device 210-1 stores the policy 250-1 in repository 480-2 such as a cache.

Thus, in accordance with one embodiment, the supplemental code 440 can be coded to retrieve the policy 250-1 from a remote server 240-2 over a network 190-3 and store a copy of the policy in a cache of a respective host computer device 210-1 on which the modified compiled application 150-1 is installed.

The application administrator 168-1 produces the policy 250-1 to include one or more rules (e.g., rule #1, rule #2, etc.) specifying conditions of using the functionality (e.g., function 413-1, function 413-2, function 413-3, etc.) supported by the original executable computer code 125-1. In other words, the rules in the policy 250-1 are used by supplemental code 440 (e.g., an evaluation engine function) to control use of functionality associated with the modified compiled application 150-1.

Note that after initial retrieval and storage of policy 250-1 in storage domain 420-1, for subsequent instantiations of modified compiled application 250-1, the supplemental code 440 attempts retrieval of the policy 250-1 from storage such as a local cache with respect to the host computer device 210-1. Thus, in response to a subsequent request by user 108-1 to execute the modified compiled application 150-1 on the host computer 210-1 at a later time, and as specified by the supplemental code 440, the supplemental code 440 retrieves the policy from a resource such as the local cache. Accordingly, the supplemental code 440 can retrieve the policy 250-1 locally from storage domain 420-1.

In certain instances, the policy 250-1 can be configured with expiry information indicating when the policy is no longer valid for use by supplemental code 440. The supplemental code 440 can check the expiry information. Upon detecting that the policy 250-1 has expired, is nearly expired, or if the supplemental code 440 determines that the policy 250-1 is unusable for some reason, the supplemental code 440 can be configured to initiate retrieval of another updated version of policy 250-1 from server 240-2.

Expiry of the policy 250-1 can also be based on occurrence of one or more specified events. For example, one or more rules in policy 250-1 can monitor the occurrence of a specific event. If the event is detected, the supplemental code 440 can prevent further use of the modified compiled application 150-1 such as by erasing the policy 250-1 from local storage.

As previously discussed, in one embodiment, the supplemental code 440 is an evaluation engine function. In accordance with policy 250-1, the supplemental code 440 can be configured to perform or prevent certain functions. For example, the supplemental code 440 may execute each of the respective rules to make control decisions.

The policy 250-1 and/or respective rules therein can include instructions encoded in accordance Java™ or any other suitable language.

By way of a non-limiting example, each of the rules in policy 250-1 can specify one or more particular types of data (facts) that are to be used to execute the respective rule. The data (facts) to be used by a rule can be data available from any of one or more different locations.

For example, the particular data to be used by a corresponding rule in policy 250-1 can specify data (such as user identifier, user settings, current time, host computer device identifier information, UDID, etc.) locally stored in the host computer device 210-1. In this instance, the supplemental code 440 retrieves the data locally from the host computer device 210-1 to execute the respective rule.

The particular data to be used by a corresponding rule can specify data (e.g., GPS or geographical information, etc.) that is available by the host computer device 210-1 via execution of an appropriate function on the host computer device 210-1. In this instance, the supplemental code 440 initiates execution of the appropriate function to obtain the data.

The particular data to be used by a corresponding rule can specify data (e.g., user identifier, user settings, current time, etc.) that is remotely stored with respect to the host computer device 210-1. In such an instance, the supplemental code 440 initiates retrieval of the data for the rule from a remote location.

In certain instances, the policy may include data (such as one or more facts) to be used when executing respective rules.

Each of the one or more rules can require retrieval and assessment of a combination of both local and remote data.

Assume in this non-limiting example embodiment that rule #1 of policy 250-1 requires that user 108-1 provide certain password information in order to be granted privileges to use one or more of the functions 413. Via a respective challenge initiated by the supplemental code 440, such as display of a user and/or password prompt to the user 108-1 on a display screen of the host computer device 210-1, the user 108-1 inputs password information. The supplemental code 440 then checks, with respect to a stored password (remote or location data) for the user 108-1, whether the received password information provided by the user 108-1 is correct or not. If the password is deemed correct by the rule, the supplemental code 440 enables use of one or more functions 413 by the user 108-1. If password is deemed incorrect by the rule, the supplemental code 440 denies use of one or more functions 413 by the user 108-1.

Assume in another non-limiting example embodiment that another rule such as rule #2 of policy 250-1 specifies further conditions of using one or more functions supported by modified compiled application 150-1. For example, rule #2 may require that user 108-1 reside within a particular geographical location in order to execute one or more functions 113 in the modified compiled application 150-1. When executing rule #2, assume that the supplemental code 440 identifies that the rule #2 requires a particular type of data (e.g., geographical location information indicating a current location of the user 108-1) for execution. Recall that each rule can specify the particular data that is to be used to execute the rule. In this instance, the supplemental code 440 initiates retrieval of required data (facts) for the rule #2. As mentioned, this may require executing an application or function to obtain the current location information. By way of a non-limiting example, based on the retrieved data, such as current geo-location of the host computer device 210-1, the supplemental code 440 executes the rule #2 and either denies or grants use of one or more of functions 413 depending on a Boolean output for the rule. In other words, in one non-limiting example embodiment, execution of the rule #2 include generating an output such as logic 1 (or true) if the user 108-1 is deemed able to use a particular function. Execution of the rule #2 can include generating an output such as logic 0 (or false) to indicate that the user 108-1 is not able to use a particular function.

More specifically, the current geographical location information can specify that the host computer device 210-1 and/or user 108-1 reside at a particular geographical location. The rule #2 can specify that the user 108-1 and/or host computer device 210-1 must be within a certain specified area in order to use one or more of functions 413. The supplemental code 440 performs a check to determine whether the user 108-1 resides within the specified area. Based on a Boolean output produced by the rule #2 indicating whether the user 108-1 and/or host computer device 210-1 is inside or outside the specified area, the supplemental code 440 allows or prevents use of one or more functions 413.

Accordingly, via supplemental code 440 such as an evaluation engine function, the supplemental code 440 can be configured to obtain particular data as specified by one or more rules in the policy 250-1 and generate control decisions for the functions 413 based on processing of the rules using the obtained data.

In accordance with further embodiments, the supplemental code 440 can be configured to intercept commands inputted to the corresponding application executing in execution domain 420-2. For example, the commands may be received from user 108-1 or other resource may specify to execute a particular one of functions 413.

Assume in this example that the requested function is only available for use by an employee of the organization. Further assume that the user 108-1 is a contractor, not an employee. Local or remote data is available to the supplemental code 440 indicating that the user 108-1 is a contractor. In such an instance, upon receiving a request to perform a function such as function 413-2, the supplemental code 440 maps the request to the appropriate rule in the policy 250-1 that has been associated with the function. The supplemental code 440 then executes the appropriate rule. The supplemental code 440 executes the rule and prevents use of the requested function because the user 108-1 is a contractor, and not an employee.

The supplemental code 440 can be configured to initiate display of a message on the display screen of the host computer device 210-1 if a request to use the particular function is denied by execution of a respective rule. For example, if a user 108-1 is denied use of functionality because they reside outside of a particular geographical area as discussed above, the supplemental code 440 can initiate display of a respective message on the display screen of host computer device 210-1 to indicate that the user 108-1 is unable to use a particular function because they are outside of a particular range.

As a further example, if a user 108-1 is denied use of functionality associated with originally compiled executable code 125-1 because they are a contractor, the supplemental code 440 can initiate display of a respective message on the display screen of host computer device 210-1 to indicate that the user 108-1 is unable to use a particular function because they are not an employee of the organization.

As yet another example, if a user 108-1 is denied use of functionality associated with originally compiled executable code 125-1 because they attempt to use an application during business hours, the supplemental code 440 can initiate display of a respective message on the display screen of host computer device 210-1 to indicate that the user 108-1 is unable to use the modified compiled application 150-1 during normal business hours.

Accordingly, the supplemental code 440 can be configured to perform an evaluation of whether to allow use of all or specific functionality supported by the originally compiled code 125-1 on the host computer device 210-1 in response to an attempt by a user 108-1 to execute the specific functionality of the modified compiled application 150-1.

Note that in addition to or as an alternative to displaying messages to user 108-1, embodiments herein can include initiating generation of an audible signal to notify a respective user of a control decision.

Further embodiments herein can include re-evaluating the policy over time. For example, as previously discussed, a rule may prevent a respective user 108-1 of host computer device 210-1 from using the modified compiled application 150-1 between 8 am and 5 pm (e.g., business hours). Assume that the user 108-1 initiates launching of the modified compiled application 150-1 (such as Facebook™ application) at 7:45 am. The rule allows the user 108-1 to communicate with friends prior to 8 am.

In one embodiment, the supplemental code 440 re-executes the policy 250-1 and/or corresponding rules based on an event such as a timeout. For example, assume that the supplemental code 440 re-executes the rule in policy 250-1 every 10-minutes and detects that the user 108-1 is no longer allowed to use the modified compiled application 150-1 or corresponding originally compiled executable code 125-1 because the current time is within normal business hours. In such an instance, the supplemental code 440 can be configured to perform one or more operations such as terminate execution of the modified compiled application 150-1 on the host computer device 210-1, prevent further use of functions 413, generate and display a message to the user 108-1 that the user 108-1 is network longer allowed to use the modified compiled application 150-1 during business hours, etc.

Figure 5:
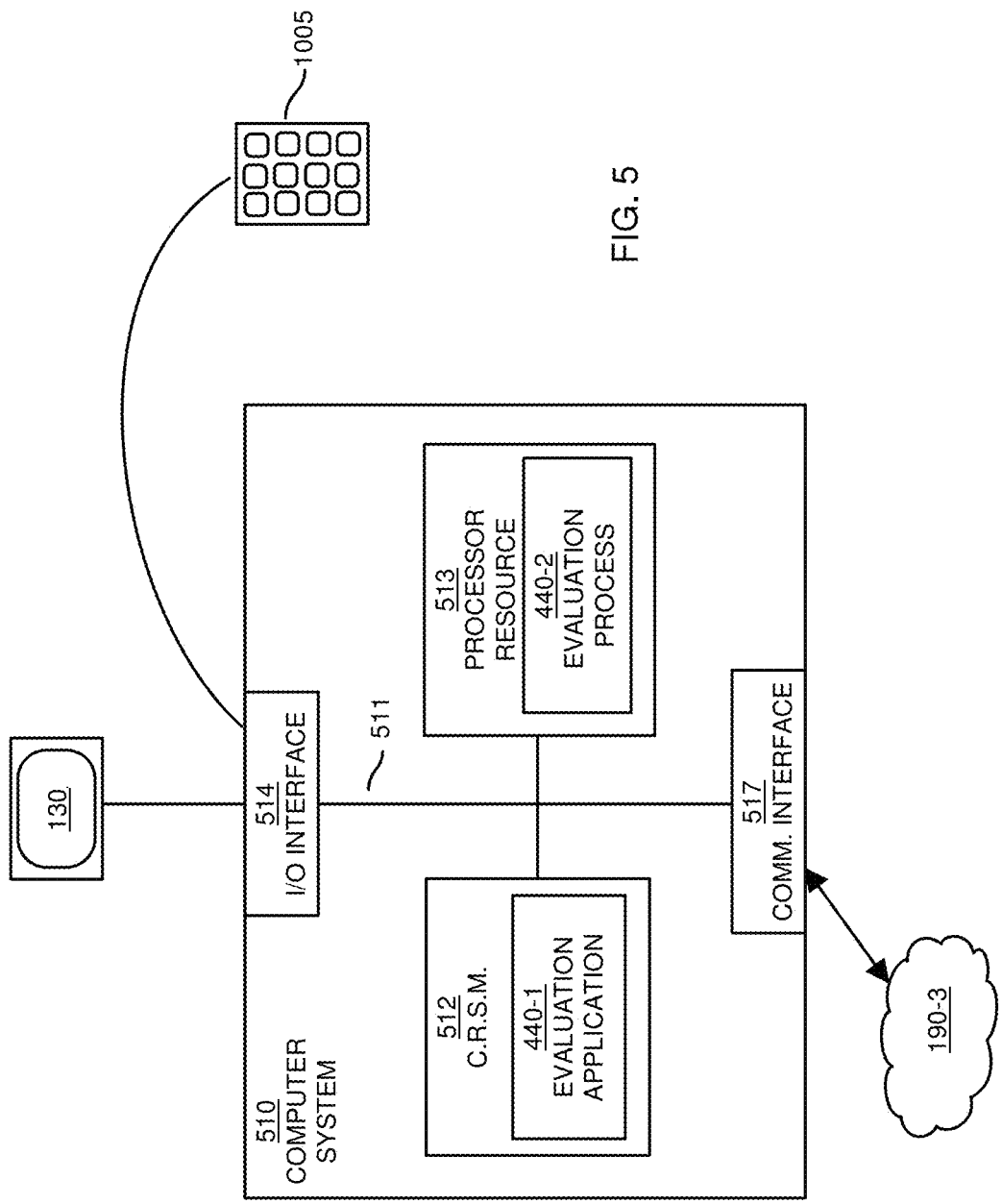
FIG. 5 is an example diagram illustrating an example computer architecture for implementing functionality according to embodiments herein.

FIG. 5 is an example block diagram of a computer system for implementing techniques according to embodiments herein.

Computer system 510 such as any of host computer devices 210 can be or include one or more computerized devices such as a personal computer, mobile device, workstation, portable computing device, console, network terminal, processing device, network device, etc.

Note that the following discussion provides a basic embodiment indicating how to execute functionality according to embodiments herein. However, it should be noted that the actual configuration for carrying out the operations as described herein can vary depending on a respective application.

As shown, computer system 510 of the present example includes an interconnect 511 that couples computer readable storage media 512 such as a non-transitory type of computer readable storage media in which digital information can be stored and retrieved, a processor resource 513 (i.e., one or more processor devices), I/O interface 514, a communications interface 517, etc.

I/O interface 514 provides connectivity to one or more repositories and, if present, other devices such as display screen 130, peripheral devices 1005 such as a keyboard, computer mouse, etc.

Computer readable storage medium 512 can be any suitable device such as memory, optical storage, hard drive, floppy disk, etc. In one embodiment, the computer readable storage medium 512 is a non-transitory computer readable storage media (i.e., any hardware storage media) to store instructions and/or data.

Communications interface 517 enables the computer system 510 and processor resource 513 to communicate over a network 190 to retrieve information from remote sources and communicate with other computers. I/O interface 514 enables processor resource 513 to retrieve respective information from server resource 170 and/or repository 180.

As shown, computer readable storage media 512 can be encoded with evaluation application 440-1 (e.g., software, firmware, etc., such as one or more instructions in supplemental code 440) executed by processor resource 513. Evaluation application 440-1 supports functionality as previously discussed with respect to supplemental code 440.

During operation of one embodiment, processor 513 accesses computer readable storage media 512 via the use of interconnect 511 in order to launch, run, execute, interpret or otherwise perform the instructions of evaluation application 440-1 stored on computer readable storage medium 512. Evaluation application 440-1 can include appropriate instructions, logic, etc., to carry out any or all functionality as discussed herein.

Execution of the evaluation application 440-1 produces processing functionality such as evaluation process 440-2 in processor 513. In other words, the evaluation process 440-2 associated with processor device 513 represents one or more aspects of executing evaluation application 440-1 within or upon the processor resource 513 in the computer system 510.

Those skilled in the art will understand that the computer system 510 can include other processes and/or software and hardware components, such as an operating system that controls allocation and use of hardware resources to execute evaluation application 440-1.

In accordance with different embodiments, note that computer system 5190 may be any of various types of devices, including, but not limited to, a mobile computer device, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Additionally, note that the modifier application executed by processing resource 140 can be configured as a set of executable instructions stored on a computer readable medium and executed by computer system 510 to modify a respective compiled application to produce a respective modified compiled application.

Functionality supported by resources in network environment 100 will now be discussed via flowcharts in FIGS. 6 and 7. Note that there will be some overlap with respect to concepts discussed above for FIGS. 1 through 5. Also, note that the processing in the below flowcharts need not always be executed in the order shown. That is, where suitable, the processing can be executed in any suitable order.

Figure 6:
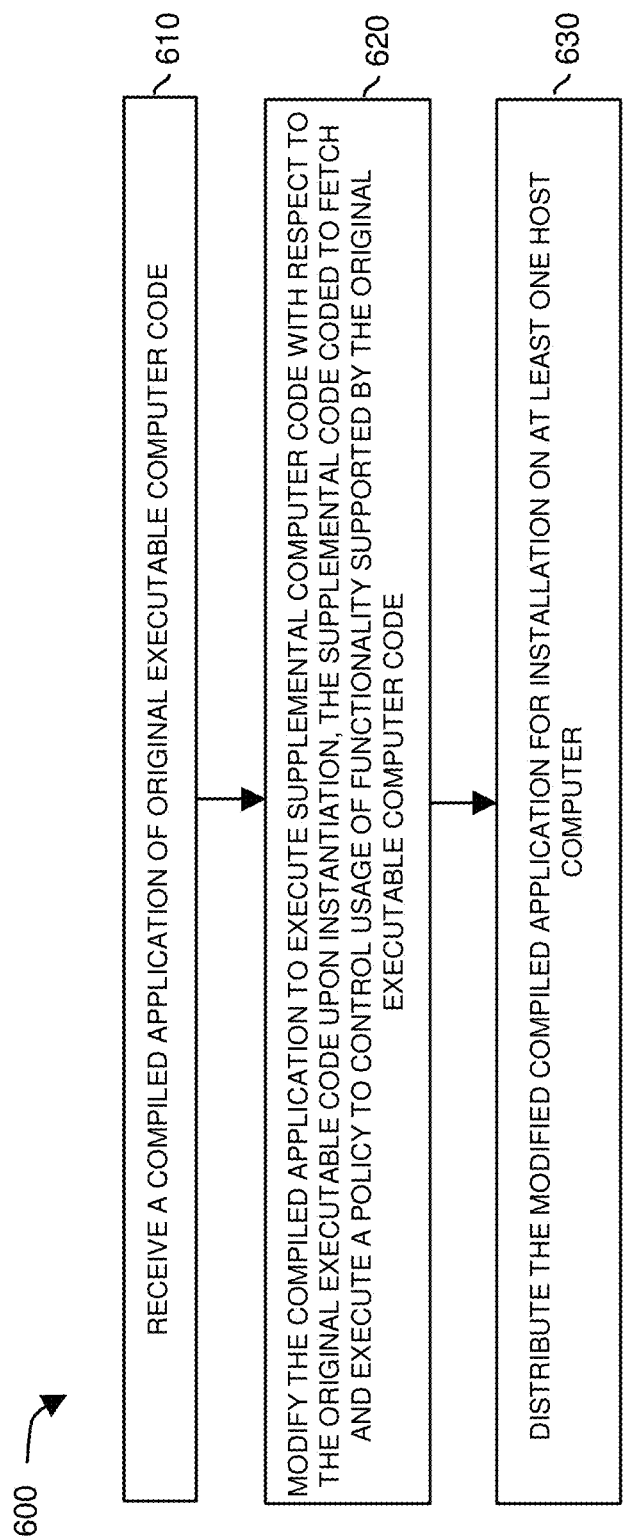
FIG. 6 is a flowchart illustrating a method of modifying originally compiled executable code according to embodiments herein

FIG. 6 is a flowchart 600 illustrating a method of modifying originally compiled executable code according to embodiments herein.

In processing block 610, the organization domain 160 receives a compiled application of original executable computer code 125.

In processing block 620, the processing source 140 modifies the compiled application to produce modified compiled application 150-1. A modification 151-1 to the originally compiled executable code 125 indicates to execute supplemental computer code 440 with respect to the original executable code 125-1 upon instantiation. The supplemental code 440 is coded to fetch and execute a policy 250-1 to control usage of functionality supported by the original executable computer code 125-1.

In processing block 630, the application administrator 168-1 distributes the modified compiled application 150-1 for installation on one or more host computer devices 210.

Figure 7:
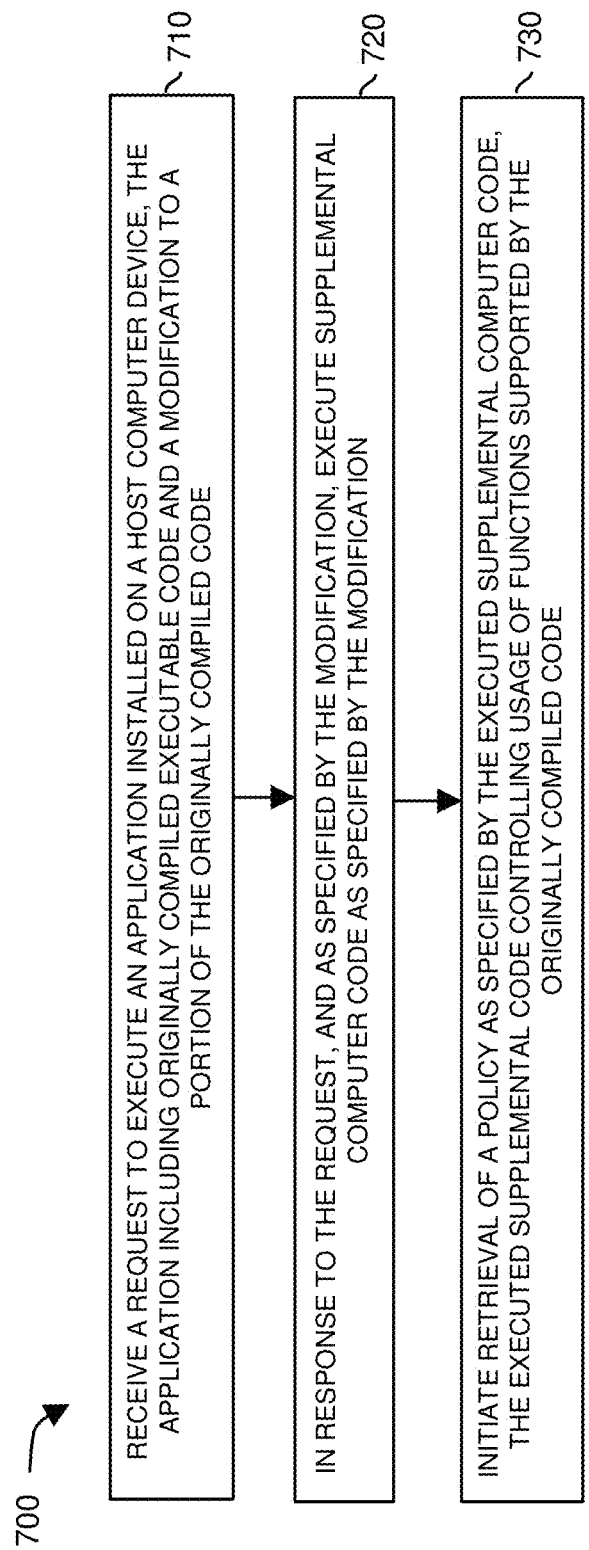
FIG. 7 is an example diagram illustrating a method of executing a modified compiled application according to embodiments herein.

FIG. 7 is a flowchart 700 illustrating execution of a modification to originally compiled executable code according to embodiments herein.

In processing block 710, the host computer device 210-1 receives a request to execute an application (such as modified compiled application 150-1) installed on host computer device 210-1. The modified compiled application 150-1 includes originally compiled executable code 125-1 and a modification 151-1 to a portion of the originally compiled code 125.

In processing block 720, in response to the request, and as specified by or in accordance with the modification 151-1 in the modified compiled application 150-1, the host computer device 210-1 executes supplemental code 440 as specified by the modification 151-1.

In processing block 730, the supplemental code 440 initiates retrieval of a policy 250-1 as specified by the executed supplemental computer code 440. In accordance with one or more rules in the policy 250-1, the executed supplemental code 440 controls usage of functions 413 supported by the originally compiled code 125.

Accordingly, an application administrator 168-1 is able to controller usage of a particular application by modifying originally compiled executable code and producing an appropriate policy.

Figure 8:
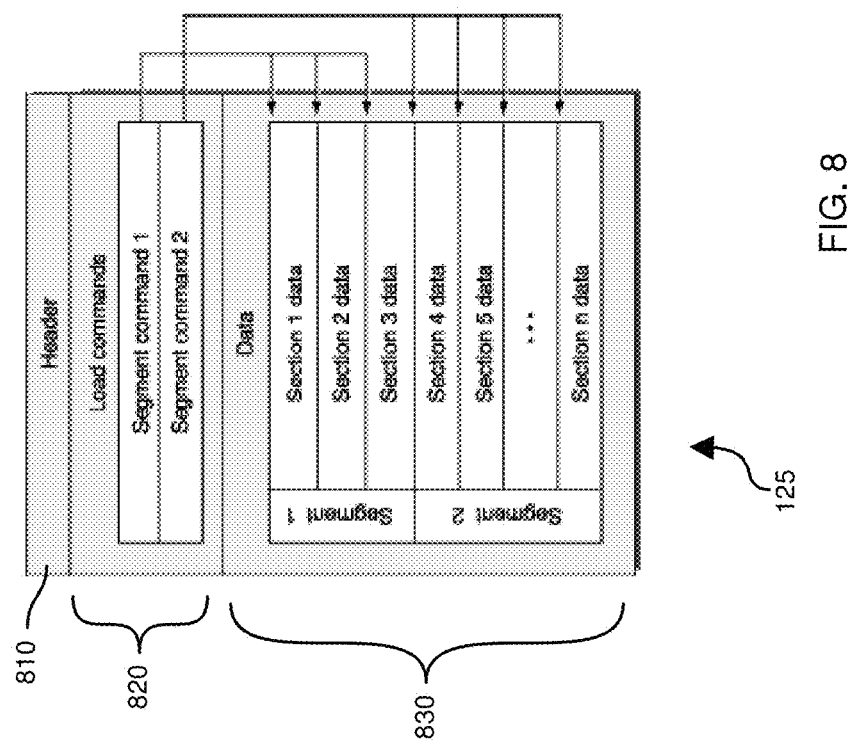
FIG. 8 is an example diagram illustrating a way of a compiled application according to embodiments herein.

FIG. 8 is an example diagram illustrating a compiled application according to embodiments herein.
Application Wrapping (OS X/iOS)

As shown, originally compiled executable code 125 in FIG. 8 can include a header, load commands, and data.

As previously discussed, application wrapping can include a modification such as injection of a library into an already compiled code, addition of machine code to already compiled code, etc. In one embodiment, so-called application wrapping is a concept of automating the addition of a library in an otherwise compiled/ready to distribute application.

One embodiment herein can include replacement of an original library in the originally compiled executable code 125 with a respective library including supplemental code 440 to execute a respective evaluation engine.

Embodiments herein can include building a library (.dylib).

In one embodiment, as shown in FIG. 8, the originally compiled executable code 125 is a so-called Mach-O file including three major regions (e.g., header 810, load commands 820, and data 830).

By way of a non-limiting example, at the beginning of the originally compiled executable code 125 is a header structure (i.e., header 810) that identifies the file by type (e.g., a Mach-O file). The header 810 also can include other basic file type information, indicates the target architecture, and contains flags specifying options that affect the interpretation of the rest of the file.

Directly following the header 810 is a series of variable-size load commands 820 that specify the layout and linkage characteristics of the file of originally compiled executable code 125. Among other information, the load commands 820 can specify:

The initial layout of the file in virtual memory
The location of the symbol table (used for dynamic linking)
The initial execution state of the main thread of the program
The names of shared libraries that contain definitions for the main executable's imported symbols Following the load commands 820, the file including originally compiled executable code 125 can include the data 830 of one or more segments. Each segment contains zero or more sections. Each section of a segment contains code or data of some particular type. Each segment defines a region of virtual memory that the dynamic linker maps into the address space of the process. The exact number and layout of segments and sections is specified by the load commands 820 and the file type associated with originally compiled executable code 125.

In user-level, fully linked Mach-O files, the last segment is typically the link edit segment. This link edit segment can include the tables of link edit information, such as the symbol table, string table, and so forth, used by the dynamic loader to link an executable file or Mach-O bundle to its dependent libraries.

Various tables within a Mach-O file refer to sections by number. Section numbering begins at 1 (not 0) and continues across segment boundaries. Thus, the first segment in a file may contain sections 1 and 2 and the second segment may contain sections 3 and 4.

When using the Stabs debugging format, the symbol table also holds debugging information. When using DWARF, debugging information is stored in the image's corresponding dSYM file, specified by the uuid_command structure.

Figure 9:
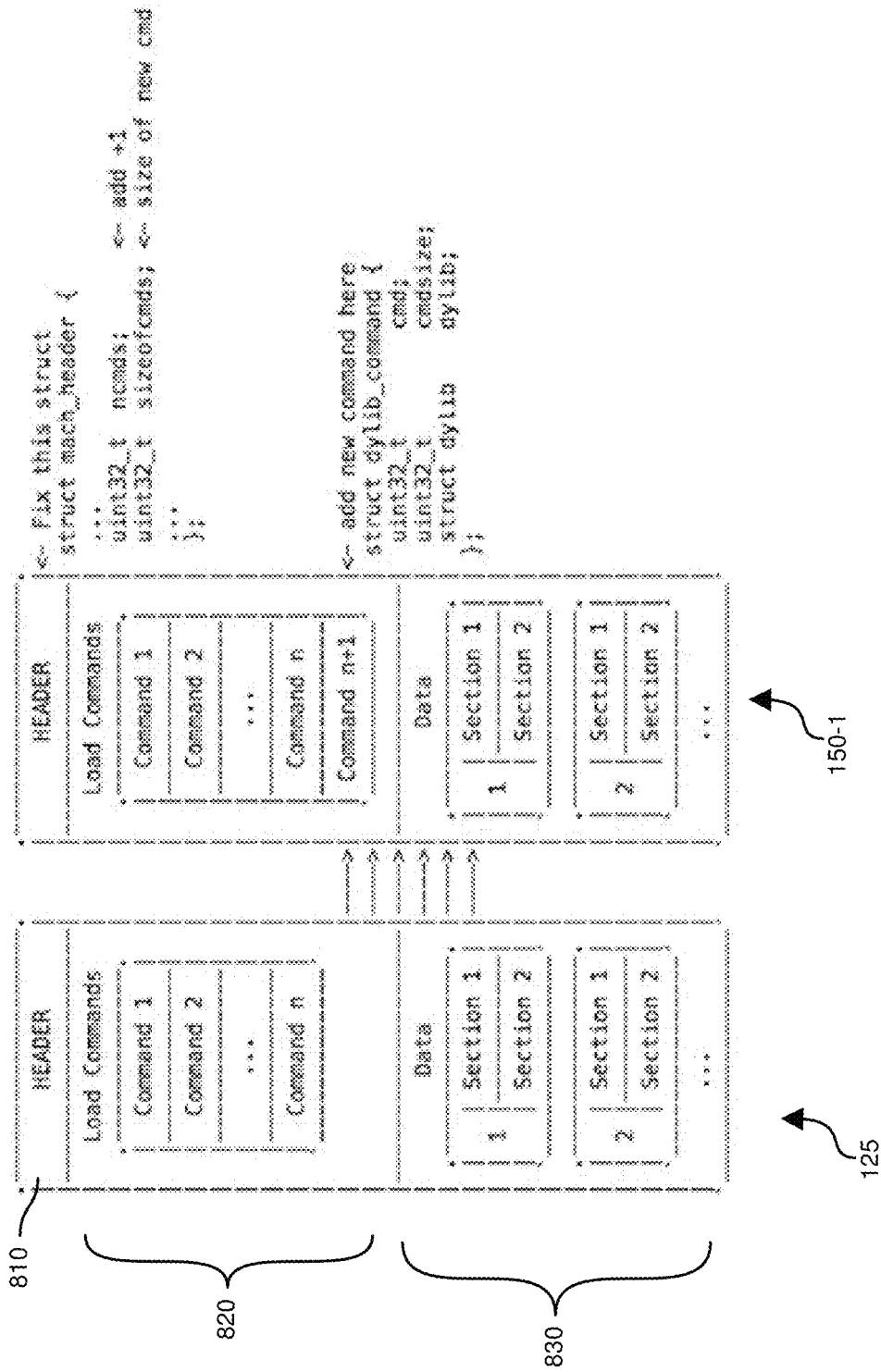
FIG. 9 is an example diagram illustrating a way of producing a modified compiled application according to embodiments herein.

FIG. 9 is an example diagram illustrating modification of a compiled application according to embodiments herein.
Application Wrapping To "wrap" or modify originally compiled executable code 125, embodiments herein can include adding a load command. By way of a non-limiting example, one way to add a load command is to replace an existing load command with a library including supplemental code 440.
Example of Dylib Injection (Replace Load Command):

This example takes Facebook.app (as of Nov. 6, 2012) and replaces an original load command (AdSupport) in the original compiled code with a new library (.dylib) as created by an application administrator 168-1. The new dylib library can be configured to load the original AdSupport library (i.e., the library being replaced) internally to avoid crashes of the application on host computer device.

```
install_name_tool -change \
"/System/Library/Frameworks/AdSupport.framework
/AdSupport" \
"@executable_path/HelloDylib.dylib" \
"/Users/drunknbass/Desktop/Facebook.app/Facebook"
```

The next step is to drop the dylib into the root of the .app bundle or wherever your load command references) and re-code.
Dylib Injection (Padding Exploit)

In one embodiment, the method of injecting a library takes advantage of extra padding before the first (_TEXT,_text) to insert a load command. By way of a non-limiting example, in one embodiment, when the load command is inserted, the header must be updated to reflect the new command/offsets.

Embodiments herein can include generating a script to inject a respective library into originally compiled executable code. The script can be configured to perform direct binary manipulation of a MachO file (i.e., compiled code) through the macholib library. The script can be configured to create a new load command of type LC_LOAD_DYLIB, pointing to the dylib we need to inject (i.e., aa.dylib) into the compiled code.

Typically, MachO files have some extra space between the load commands and the next section of the file (_TEXT_), the script as discussed herein can verify this extra padding exists and is enough to insert our new load command (very little padding may be required, around 60-70 k). If the space doesn't exist, embodiments herein can include reverting to the first method such as (replace an existing original load library command in originally compiled executable code with a replacement load library command to load a new library including supplemental code instead of loading an original library, load the original dylib library being replaced into the new load library including the supplemental code, remap symbols found in the original dylib to . . . ).

Embodiments herein can further include updating the header to reflect the new count of Load Commands and the new size (in bytes) of the whole list.

Figure 10:
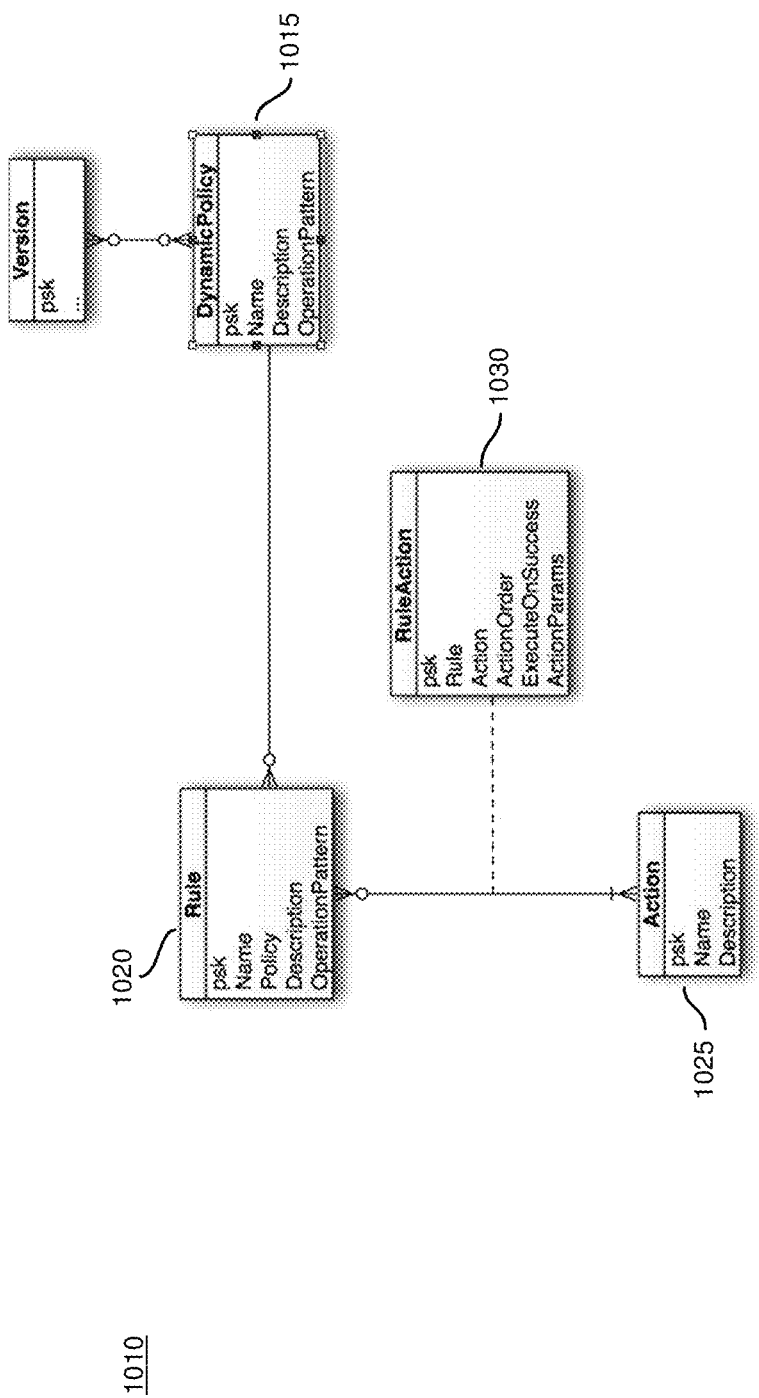
FIG. 10 is an example diagram illustrating of a backend database schema according to embodiments herein.

FIG. 10 is an example diagram illustrating a backend database schema according to embodiments herein.

As shown, schema 1010 includes DynamicPolicy table 1015. This is a main table that links Dynamic policies to application versions. OperationPattern is a field that contains JS (e.g., JAVASCRIPT) code that evaluates to true or false to determine if the OnSuccess Actions of the policy should be applied to the application. This is a combination of executing the individual rules, for example: (rule_1 && (rule_2 ||rule_3)). The variable names are built by doing rule_[rule psk].

Schema 1010 includes Rule table 1020: This is the criteria that will be evaluated, which combined with other rules, form a policy. Similar to DynamicPolicy table 1015, the OperationPattern field is JS code which should evaluate to true or false. This code though, is based on facts, for example: facts ["com.apperian.device.network"]=0 (where 0 means WiFi).

Schema 1010 includes Action table 1025 includes a static set of different actions for the device to take on the wrapped app. For example: Allow, Quit, Uninstall.

identifier, etc.) from the host computer device requesting the policy. Based on these parameters, the server resource 240-2 looks up the dynamic policies/rules that should be applied to the requesting application.

In one embodiment, in response to the request for a policy, the server resource 240-2 builds an evaluator script (JAVASCRIPT) which is sent to the requesting host computer device so that the host computer device can evaluate the rules offline, such as based on facts gathered at run time (i.e. gps location, network status, jailbroken dev, etc).

The following is an example of a sample JSON request from a host computer device requesting a policy:

```
{
    "params": {
        "lang": "en_US",
        "appbundle": "com.apperian.Controllable",
        "udid": "7dd8f5d2b4ec7931b3249192e68f0ed2aae8bbc7"
    },
    "jsonrpc": "2.0",
    "method": "com.apperian.eas.dynpol.getpolicyevaluator",
    "!version": 1.1,
    "id": 22,
    "apiVersion": "1.0"
}
```

In one embodiment, the server resource 240-2 responds with the policy/rule as follows:

```
{
    "jsonrpc": "2.0",
    "id": 22,
    "result": {
        "external_facts": {
            "com.test.companyX.eulasigned": true
        },
        "required_facts": [
            "com.apperian.device.latitude",
            "com.apperian.device.longitude"
        ],
        "evaluator": "function InstructionsResult( ){this.instructions = { };this.expireAfter = 0;this.params={ };}var result = new InstructionsResult( );function evaluateFacts (facts) {var rule__12 = (Math.acos(Math.sin((42.35785201773235 * (Math.PI / 180.0))) * Math.sin((facts[\"com.apperian.device.latitude\"] * (Math.PI / 180.0))) + Math.cos((42.35785201773235 * (Math.PI / 180.0))) * Math.cos((facts['com.apperian.device.latitude'] * (Math.PI / 180.0))) * Math.cos((facts['com.apperian.device.longitude'] * (Math.PI / 180.0)) − (−71.06969832326286 * (Math.PI / 180.0)))) * 6371 * 1000) < 2396.4386030785504;var polresult__13 = rule__12;if (polresult__13) {result.instructions = JSON.parse(\"{\\\"com.apperian.keepcalmandcarryon.lol\\\":{\\\"sortweight\\\":500}}\");}else {result.instructions = JSON.parse(\"{\\\"com.apperian.block\\\":{\\\"sortweight\\\":200}}\");}return JSON.stringify(result);}"
    }
}
```

Schema 1010 includes RuleAction table 1030, which joins Rules with Actions. If a rule's OperationPattern evaluates to true and the whole policy evaluates to true, the Actions associated with the Rule which have a value of true in ExecuteOnSuccess are executed. Those with ExecuteOnSuccess=false are executed in the case where the rule (or the whole policy) fails to evaluate.

Figure 11:
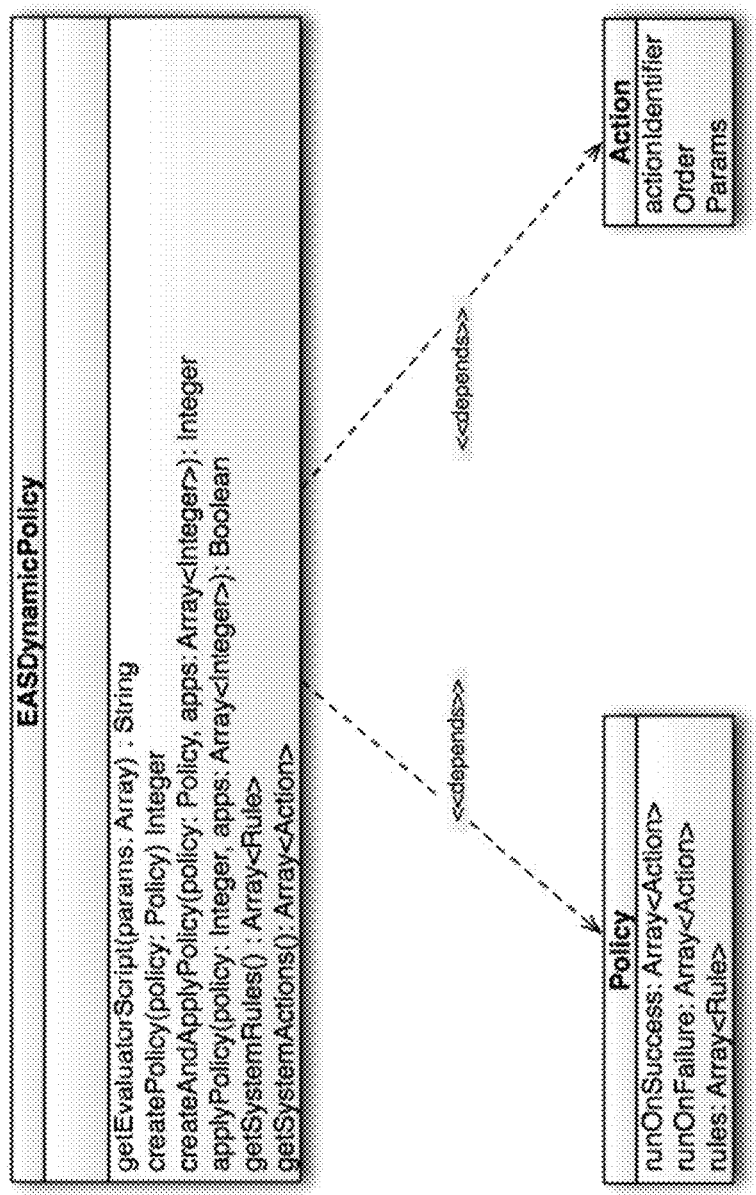
FIG. 11 is an example diagram illustrating a web service according to embodiments herein.

FIG. 11 is an example diagram illustrating a web service according to embodiments herein.
WebService API In one embodiment, in the backend, a web service 1100 (e.g., as implemented by server resource 240-2) receives a set of one or more parameters (e.g., user id, device id, app bundle In one embodiment, this above code in JavaScript accepts a list of facts/parameters used by rules and based on these facts it will return an array with the list of actions (and parameters when appropriate), which the supplemental code 440 will then enforce. (See below for samples).

Sample Rules/Policies:

The following is a sample JS rule/policy generated from a Circular Geofence policy (e.g., a policy that requires a user to be in a certain region to execute an a modified compiled application) stored in the database accessible by server resource 240-2, centered at latitude 42.26, longitude: −71.07 and radius of ~1.5 miles (2.4 km):

```
function InstructionsResult( ) {
    this.instructions = { };
    this.expireAfter = 0;
    this.params = { };
}
var result = new InstructionsResult( );
function evaluateFacts(facts) {
    var rule__12 = (Math.acos(Math.sin((42.35785201773235 * (Math.PI / 180.0))) *
Math.sin((facts["com.apperian.device.latitude"] * (Math.PI / 180.0))) +
Math.cos((42.35785201773235 * (Math.PI / 180.0))) *
Math.cos((facts['com.apperian.device.latitude'] * (Math.PI / 180.0))) *
Math.cos((facts['com.apperian.device.longitude'] * (Math.PI / 180.0)) -
(-71.06969832326286 * (Math.PI / 180.0)))) * 6371 * 1000) < 2396.4386030785504;
    var polresult__13 = rule__12;
    if(polresult__13) {
        result.instructions =
JSON.parse("{\"com.apperian.keepcalmandcarryon.lol\":{\"sortweight\":500}}");
    } else {
    result.instructions = JSON.parse("{\"com.apperian.block\":{\"sortweight\":200}}");
    }
return JSON.stringify(result);
}
```

Which takes as input:

```
var facts = { };
facts['com.apperian.device.latitude'] = 42.35;
facts['com.apperian.device.longitude'] = -71.06;
```

And returns:

```
{
    "expireAfter": 0,
    "params": {
    },
    "instructions": {
        "com.apperian.keepcalmandcarryon.lol": {
            "sortweight": 500
        }
    }
}
```

Changing input data to being outside the geofence area results in generation of a quit instruction as follows:

```
{
    "expireAfter": 0,
    "params": {
    },
    "instructions": {
        "com.apperian.block": {
            "sortweight": 200
        }
    }
}
```

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claimed:
1. A method comprising:
receiving a compiled application of original executable computer code;
modifying by a processor the compiled application to inject a new load command to load supplemental computer code with respect to the original executable computer code in the compiled application, the modified compiled application configured to execute the supplemental computer code with respect to the original executable computer code upon instantiation, the supplemental computer code coded to fetch, execute, and evaluate a policy of at least one rule in view of one or more particular types of data to be used to execute the at least one rule to control usage of functionality supported by the original executable computer code based on the at least one rule in the policy, wherein a mapping information is used to fetch the policy; and providing access to the modified compiled application for installation of the modified compiled application on at least one host computer;

wherein the modifying includes:

verifying that the compiled application includes padding space of unused bits in which to insert the new load command, the padding space disposed between respective existing load commands in the received compiled application and subsequent data sections in the received compiled application;

inserting the new load command into the padding space, the new load command pointing to the supplemental computer code to be injected into the original executable computer code upon the instantiation of the modified compiled application;

modifying a header in the received compiled application, the header defining attributes of the compiled application, the header modified to indicate a change to a number of load commands to be executed upon the instantiation of the modified compiled application, the change indicating to execute the respective existing load commands in the received compiled application and the new load command inserted into the padding space;

receiving the supplemental computer code; and adding the supplemental computer code to the original executable computer code.

2. the method as in claim 1, wherein the supplemental code is coded to evaluate the at least one rule in the policy in view of settings of corresponding status information pertaining to the at least one rule.

3. The method as in claim 1, wherein the policy includes executable code to be executed by the supplemental computer code.

4. The method as in claim 1, wherein the supplemental code is coded to retrieve the policy from a remote resource over a server in a network and store a copy of the policy in a cache of a respective host computer on which the modified compiled application is installed; and wherein an administrator produces the policy to include multiple rules specifying conditions of using the functionality supported by the original executable computer code.

5. The method as in claim 4, wherein the supplemental code is coded to attempt retrieval of the policy from the cache.

6. The method as in claim 1, wherein the supplemental code is coded to obtain unique identity information of a user initiating execution of the modified compiled application and transmit the unique identity information to a server that stores the policy, an administrator producing the policy to control usage of the functionality by the user.

7. The method as in claim 1, wherein the supplemental code is an evaluation engine function coded to perform an evaluation of whether to allow use of specific functionality supported by the original executable computer code in response to an attempt by a user to execute the specific functionality.

8. The method as in claim 1, wherein modifying the compiled application to include the new load command further comprises:

replacing an original existing load command in the received compiled application with the new load command to load the supplemental computer code upon the instantiation.

9. The method as in claim 8, wherein the original existing load command indicated to load the original executable computer code in the compiled application, the method further comprising:

configuring the supplemental computer code to load the original executable computer code in the compiled application upon the instantiation of the modified compiled application.

10. The method as in claim 1, wherein the new load command specifies to load a respective library upon the instantiation of the modified compiled application, the respective library including the supplemental computer code.

11. The method as in claim 1, wherein the policy is a first policy; and wherein the supplemental computer code is operable to retrieve a second policy in response to detecting that the first policy is no longer usable, the second policy being a substitute for the first policy.

12. The method as in claim 1, wherein the policy is a first policy assigned expiry information indicating when the first policy is no longer valid; and wherein the supplemental computer code is operable to retrieve a second policy to replace the first policy in response to detecting that the expiry information indicates that the first policy is no longer valid.

13. The method as in claim 1, wherein the supplemental computer code is operable to prevent further use of the policy and the modified compiled application upon detection of a predetermined event.

14. A system comprising: a host computer processor hardware; and computer instructions executed by the host computer processor hardware to perform operations of:

receiving a compiled application of original executable computer code;

modifying the compiled application to inject a new load command to load supplemental computer code with respect to the original executable computer code in the compiled application, the modified compiled application configured to execute the supplemental computer code with respect to the original executable computer code upon instantiation, the supplemental computer code coded to fetch, execute, and evaluate a policy of a set of rules in view of one or more particular types of data to be used to execute the set of rules to control usage of functionality supported by the original executable computer code based on the at least one rule in the policy, wherein a mapping information is used to fetch the policy; and providing access to the modified compiled application for installation of the modified compiled application on at least one host computer;

wherein the modifying includes:

verifying that the compiled application includes padding space of unused bits in which to insert the new load command, the padding space disposed between respective existing load commands in the received compiled application and subsequent data sections in the received compiled application;

inserting the new load command into the padding space, the new load command pointing to the supplemental computer code to be injected into the original executable computer code upon the instantiation of the modified compiled application;

modifying a header in the received compiled application, the header defining attributes of the compiled application, the header modified to indicate a change to a number of load commands to be executed upon the instantiation of the modified compiled application, the change indicating to execute the respective existing load commands in the received compiled application and the new load command inserted into the padding space;

receiving the supplemental computer code; and adding the supplemental computer code to the original executable computer code.

15. The system as in claim 14, wherein the supplemental computer code is an evaluation engine that executes the policy to control usage of functions supported by the originally compiled code; and the evaluation engine coded to obtain data as specified by the set of rules in the policy and generate control decisions for the functions based on processing of the set of rules using the obtained data.

16. The system as in claim 14, wherein the supplemental computer code is coded to retrieve the policy as executable computer code from a remote server resource over a network and execute the computer code in the retrieved policy to control usage of the functions supported by the originally compiled code.

17. The system as in claim 14, wherein the supplemental computer code is coded to:

obtain unique identity information of a user initiating execution of the modified compiled application on the host computer processor hardware, transmit the unique identity information to a server that stores the policy, an application administrator producing the policy to control usage of the functionality by the user, and receive the policy from the server, the policy customized to control use of the functionality by the user.

18. The system as in claim 14, wherein the supplemental code is an evaluation engine coded to perform an evaluation of whether to allow use of specific functionality supported by the originally compiled code on the host computer processor hardware in response to an attempt by a user of the host computer to execute the specific functionality.

19. A computer-readable hardware storage medium having instructions stored thereon for processing data information, such that the instructions, when carried out by a processing device, cause the processing device to perform operations of:

receiving a compiled application of original executable computer code;

modifying the compiled application to inject a new load command to load supplemental computer code with respect to the original executable computer code in the compiled application, the modified compiled application configured to execute the supplemental computer code with respect to the original executable computer code upon instantiation, the supplemental computer code coded to fetch, execute, and evaluate a policy of a set of rules in view of one or more particular types of data to be used to execute the set of rules to control usage of functionality supported by the original executable computer code based on the at least one rule in the policy, wherein a mapping information is used to fetch the policy; and providing access to the modified compiled application for installation of the modified compiled application on at least one host computer;

wherein the modifying includes:

verifying that the compiled application includes padding space of unused bits in which to insert the new load command, the padding space disposed between respective existing load commands in the received compiled application and subsequent data sections in the received compiled application;

inserting the new load command into the padding space, the new load command pointing to the supplemental computer code to be injected into the original executable computer code upon the instantiation of the modified compiled application;

modifying a header in the received compiled application, the header defining attributes of the compiled application, the header modified to indicate a change to a number of load commands to be executed upon the instantiation of the modified compiled application, the change indicating to execute the respective existing load commands in the received compiled application and the new load command inserted into the padding space;

receiving the supplemental computer code; and adding the supplemental computer code to the original executable computer code.

* * * * *